(12) United States Patent
Huang et al.

(10) Patent No.: US 11,917,241 B2
(45) Date of Patent: Feb. 27, 2024

(54) ELECTRONIC DEVICE AND ITS EXECUTION METHOD AND COMPUTER-READABLE MEDIUM

(71) Applicant: ARRIS Enterprises LLC, Suwanee, GA (US)

(72) Inventors: Xiao-Song Huang, Shanghai (CN); Hong-Bin Zhao, Shanghai (CN); Hong-Chao Zheng, Shanghai (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 18/099,445

(22) Filed: Jan. 20, 2023

(65) Prior Publication Data
US 2023/0239533 A1    Jul. 27, 2023

(30) Foreign Application Priority Data

Jan. 21, 2022   (CN) .......................... 202210070807.7

(51) Int. Cl.
*H04N 21/44*   (2011.01)
*H04N 19/00*   (2014.01)

(52) U.S. Cl.
CPC ....... *H04N 21/44016* (2013.01); *H04N 19/00* (2013.01)

(58) Field of Classification Search
CPC ............ H04N 21/44016; H04N 19/00; H04N 21/4384; H04N 21/44008; H04N 21/812; H04N 21/8456
See application file for complete search history.

(56) References Cited

U.S. PATENT DOCUMENTS

| 2010/0118941 A1 | 5/2010 | Taylor et al. |
| 2019/0149876 A1 | 5/2019 | Nguyen et al. |
| 2021/0112313 A1 | 4/2021 | Neumeier et al. |

OTHER PUBLICATIONS

International Search Report and Written Opinion dated May 11, 2023 in International Application No. PCT/US2023/011213.

*Primary Examiner* — Anthony Bantamoi
(74) *Attorney, Agent, or Firm* — Wenderoth, Lind & Ponack, L.L.P.

(57) ABSTRACT

The present disclosure relates to an electronic device and its execution method and a computer-readable medium. An electronic device, comprising: a memory having instructions stored thereon; a processor configured to execute instructions stored on the memory to cause the electronic device to perform the following operations: analyzing an original video stream being played to determine start time and duration of a first video stream part to be replaced in the original video stream; retrieving a second video stream part with the same duration; playing the second video stream part in a front end at the determined start time to play the original video stream in a backend; and playing the original video stream in the front end after finishing playing the second video stream part.

20 Claims, 4 Drawing Sheets

301 analyzing an original video stream being played to determine start time and duration of a first video stream part to be replaced in the original video stream

↓

302 retrieving a second video stream part with the same duration

↓

303 playing the second video stream part in a front end at the determined start time to play the original video stream in background

↓

304 playing the original video stream in the front end after finishing playing the second video stream part

ELECTRONIC DEVICE AND ITS EXECUTION METHOD AND COMPUTER-READABLE MEDIUM

TECHNICAL FIELD

The present disclosure generally relates to a video stream play device, and more specifically, relates to an electronic device, a method and a computer-readable medium used to replace part of the video stream content of the video stream being played.

BACKGROUND ART

Generally, operators provide streaming media services through set-top box devices (STB, Set-Top-Box). For example, an operator can provide streaming media services in the form of digital video broadcast (DVB) live broadcast through a set-top box of a television under the Android system. Here, the video stream to be played is pre-coded or constructed by the operator, so the content in the video stream is fixed during play. For advertising business, the part of the video stream involving the content of advertising scenarios is included in the pre-coded video stream. Therefore, the advertising content part of the video stream in the form of DVB live broadcast is also fixed when it is played.

There is still a need to optimize video stream play.

SUMMARY OF THE INVENTION

Some aspects of the present disclosure relate to an electronic device, comprising: a memory, in which instructions are stored; and a processor, configured to execute instructions stored in the memory to cause the electronic device to execute the following operations: analyzing an original video stream being played to determine the start time and duration of a first video stream part to be replaced in the original video stream; retrieving a second video stream part with the same duration; playing the second video stream part in a front end at the determined start time to play the original video stream in background; and playing the original video stream in the front end after finishing playing the second video stream part.

In some aspects, retrieving the second video stream part with the same duration includes retrieving the second video stream part with the same duration from a remote server.

In some aspects, the first video stream part includes a pre-coded advertising content and the second video stream part includes an OTT advertising content.

In some aspects, retrieving the second video stream part with the same duration includes retrieving the second video stream part specific to a user according to historical play data of the user.

In some aspects, the decoding of the original video stream is simplified during the original video stream is played in the background.

In some aspects, simplifying of the decoding of the original video stream starts at a first preset time after the determined start time.

In some aspects, normal decoding of the original video stream starts at a second preset time before the play of the second video stream ends.

Some aspects of the present disclosure relate to an execution method of the electronic device, comprising: analyzing an original video stream being played to determine start time and duration of a first video stream part to be replaced in the original video stream; retrieving a second video stream part with the same duration; playing the second video stream part in a front end at the determined start time to play the original video stream in background; and playing the original video stream in the front end after finishing playing the second video stream part.

Some aspects of the present disclosure relate to a non-transitory computer-readable medium, in which instructions are stored, and the instructions, when executed by a processor of an electronic device, cause the electronic device to execute the following operations: analyzing an original video stream being played to determine start time and duration of a first video stream part to be replaced in the original video stream; retrieving a second video stream part with the same duration; playing the second video stream part in a front end at the determined start time to play the original video stream in background; and playing the original video stream in the front end after finishing playing the second video stream part.

Some aspects of the present disclosure relate to a computer program product, comprising computer instructions, which implement the method according to any one of the above when executed by a processor.

BRIEF DESCRIPTION OF THE ATTACHED DRAWINGS

For a better understanding of the present disclosure and to show how to realize the present disclosure, examples are herein described with reference to the attached drawings, in which.

It should be noted that throughout the attached drawings, similar reference numerals and signs refer to corresponding parts.

Specific Embodiments

Figure 1:
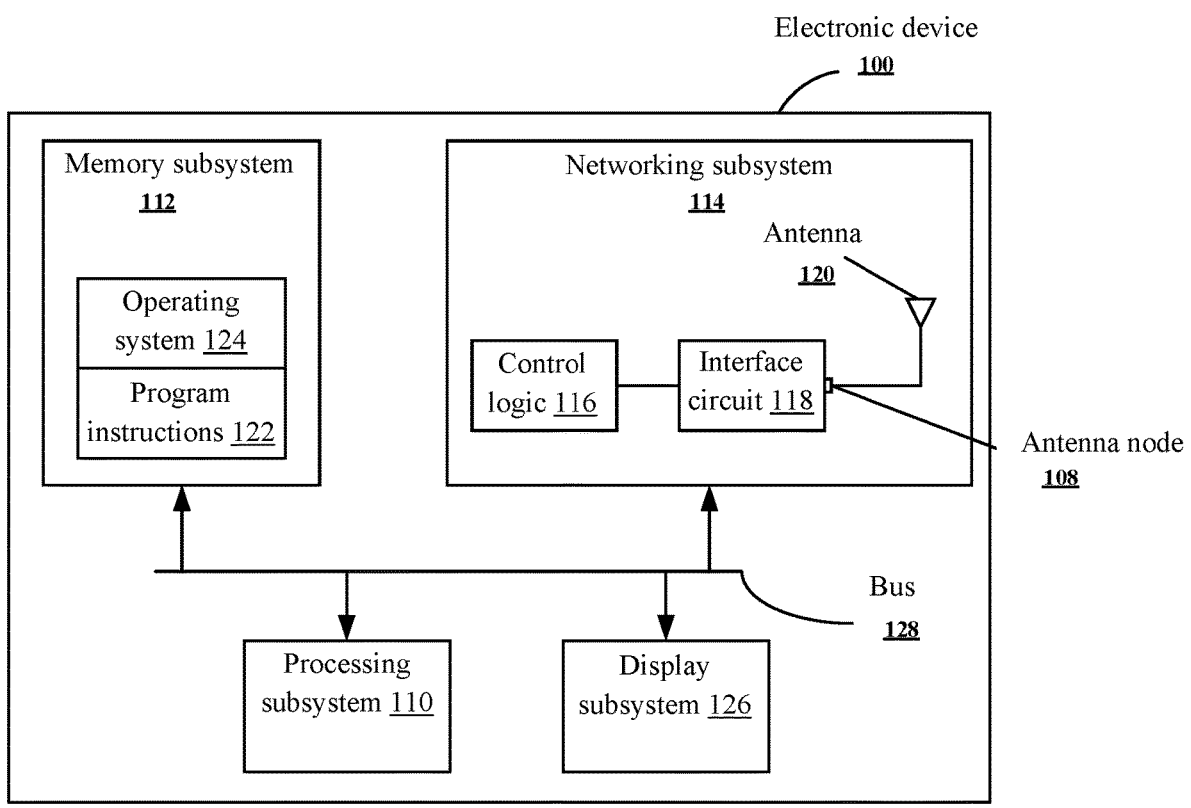
FIG. 1 is a schematic diagram of an exemplary electronic device according to an embodiment of the present disclosure.

The following detailed description is made with reference to the attached drawings, and the following detailed description is provided to facilitate comprehensive understanding of various exemplary embodiments of the present disclosure. The following description includes various details to facilitate understanding. However, these details are merely considered as examples, not for limiting the present disclosure. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications may be made to the examples described in the present specification without departing from the gist and scope of the present disclosure.

As mentioned above, a video stream in the form of digital video broadcast (DVB) live broadcast is pre-coded or constructed by an operator, so the content in the video stream being played is fixed. However, for the time periods of some of the video streams, it is expected that different video stream parts can be played according to different needs. For example, for an advertising video stream part, it may be expected to play advertising video stream parts with different contents according to different users. Also, some of these video streams may be inappropriate to play for some unexpected reasons and therefore are expected to be replaced.

The present disclosure provides an electronic device, a method and a computer-readable medium used to replace part of the video stream content in the video stream being played. In the present disclosure, the start time and duration of the video stream part to be replaced in the original video stream are determined by analyzing the original video stream being played. The original video stream here may be a pre-coded video stream being played, and the video stream part to be replaced may be, for example, an advertising video stream part thereof. After the start time and duration are determined, a new video stream part with the same duration may be retrieved. The new video stream part may be played at the front end at the determined start time to replace the content of this time period in the original video stream, and the original video stream may be played in the background to ensure that the new video stream part and the original video stream are switched smoothly. After finishing playing the new video stream part, the original video stream continues to be played in the front end, thereby completing the replacement process. This replacement process allows for flexible adjustment of some of the content in the encoded video stream, which is particularly favorable to advertising and adds flexibility to adapt to different needs.

Next, the embodiments of the present disclosure will be described in detail with reference to the attached drawings.

FIG. 1 presents a block diagram illustrating an exemplary electronic device 100 according to some embodiments.

The electronic device 100 may be used to implement various embodiments of the method described below according to the present disclosure. The electronic device 100 may comprise a processing subsystem 110, a memory subsystem 112, and a networking subsystem 114. The processing subsystem 110 comprises one or a plurality of devices configured to execute computing operations. For example, the processing subsystem 110 may comprise one or a plurality of microprocessors, ASICs, microcontrollers, programmable logic devices, graphics processing units (GPU) and/or one or a plurality of digital signal processors (DSPs).

The memory subsystem 112 comprises one or a plurality of devices for storing data and/or instructions used for the processing subsystem 110 and the networking subsystem 114. For example, the memory subsystem 112 may comprise a dynamic random-access memory (DRAM), static random-access memory (SRAM), and/or other types of memory (sometimes collectively or individually referred to as "computer-readable storage medium").

In some embodiments, the memory subsystem 112 is coupled to one or a plurality of high-capacity mass storage devices (not shown). For example, the memory subsystem 112 may be coupled to a magnetic or an optical driver, a solid-state driver, or another type of mass storage device. In these embodiments, the electronic device 100 may use the memory subsystem 112 as a fast-access storage of frequently used data, while the mass storage device is used for storing infrequently used data.

The networking subsystem 114 comprises one or a plurality of devices that are configured to be coupled to and/or communicate over wired and/or wireless networks (for example, to execute network operations), comprising: control logic 116, interface circuit 118, and one or a plurality of antennas 120 (or antenna elements). (Although FIG. 1 comprises one or a plurality of antennas 120, in some embodiments, the electronic device 100 comprises one or a plurality of nodes, such as node 108, which may be coupled to one or a plurality of antennas 120. Therefore, the electronic device 100 may or may not comprise one or a plurality of antennas 120.) For example, the networking subsystem 114 may comprise a Bluetooth networking system, a cellular networking system (for example, 3G/4G/5G networks, such as UMTS, LTE, etc.), a USB networking system, a networking system based on the standards described in IEEE 802.11 (for example, Wi-Fi networking system), Ethernet networking system, and/or another networking system.

In the electronic device 100, a bus 128 is used to couple the processing subsystem 110, the memory subsystem 112, and the networking subsystem 114 together. The bus 128 may comprise electrical, optical, and/or electro-optical connections of the subsystems through which commands, data and the like may be transmitted. Although only one bus 128 is shown for clarity, different embodiments may comprise electrical, optical, and/or electro-optical connections of different numbers or configurations among the subsystems.

In some embodiments, the electronic device 100 comprises a display subsystem 126 for showing information on a display device, which may comprise a display driver and a display, such as a liquid crystal display and a multi-touch screen, etc.

Although specific components are used to describe the electronic device 100, in alternative embodiments, different components and/or subsystems may exist in the electronic device 100. For example, the electronic device 100 may comprise one or a plurality of additional processing subsystems, memory subsystems, networking subsystems, and/or display subsystems. In addition, the electronic device 100 may not have one or a plurality of the subsystems. Furthermore, in some embodiments, the electronic device 100 may comprise one or a plurality of additional subsystems not shown in FIG. 1. Also, although separate subsystems are shown in FIG. 1, in some embodiments, some or all of the given subsystems or components may be integrated into one or a plurality of the other subsystems or components in the electronic device 100. For example, in some embodiments, an operating system 124 comprises program instructions 122 and/or the interface circuit 118 comprises control logic 116.

Figure 2:
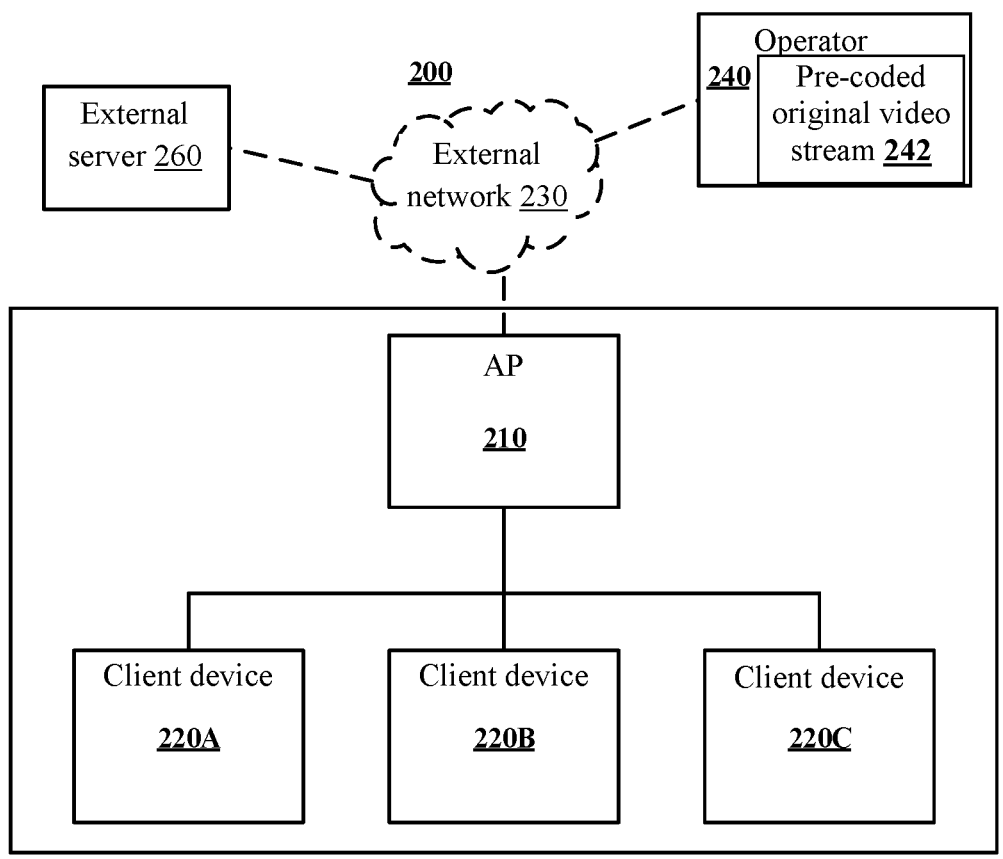
FIG. 2 is a schematic diagram of an exemplary network environment according to an embodiment of the present disclosure.

FIG. 2 is a schematic diagram showing an exemplary network environment 100 comprising the electronic device shown in FIG. 1 according to an embodiment of the present disclosure.

The exemplary network environment 200 may comprise an AP 210 and one or a plurality of client devices 220A, 220B, and 220C (hereinafter, collectively referred to as client device 220 for simplicity). The electronic device 100 shown in FIG. 1 may be implemented as the AP 210 or a part thereof as shown in FIG. 2, or as a client device or a part thereof.

An AP is an access point device specified according to the 802.11 protocol, for example. The AP 210 is used to provide wireless network connection for the client device 220. Specifically, the AP 210 may receive/route various types of communications from the client device 220 and/or transmit/route various types of communications to the client device 220. It should be noted that the AP described herein may include routers, gateways, set-top boxes, home controllers and other devices with AP functions.

In some embodiments, the client device 220 may be any electronic device having at least one network interface. For example, the client device 220 may be: a desktop computer, a laptop computer, a server, a mainframe computer, a cloud-based computer, a tablet computer, a smart phone, a smart watch, a wearable device, a consumer electronic device, a portable computing device, a radio node, a router, a switch, a repeater, an access point and/or other electronic devices. The client device 220 communicates with the AP 210 using its network interface, thereby accessing the external network 230 via the AP 210. Although three client devices are shown in FIG. 2, it should be understood that the number of client devices that the AP 210 is capable of connecting to may be fewer or more than three, depending on the network capacity supported by the AP 210.

The external network 230 may be a wide area network (WAN), such as the Internet. The AP 210 can communicate with an operator 240 or a remote server 260 through the external network 230.

Figure 3:
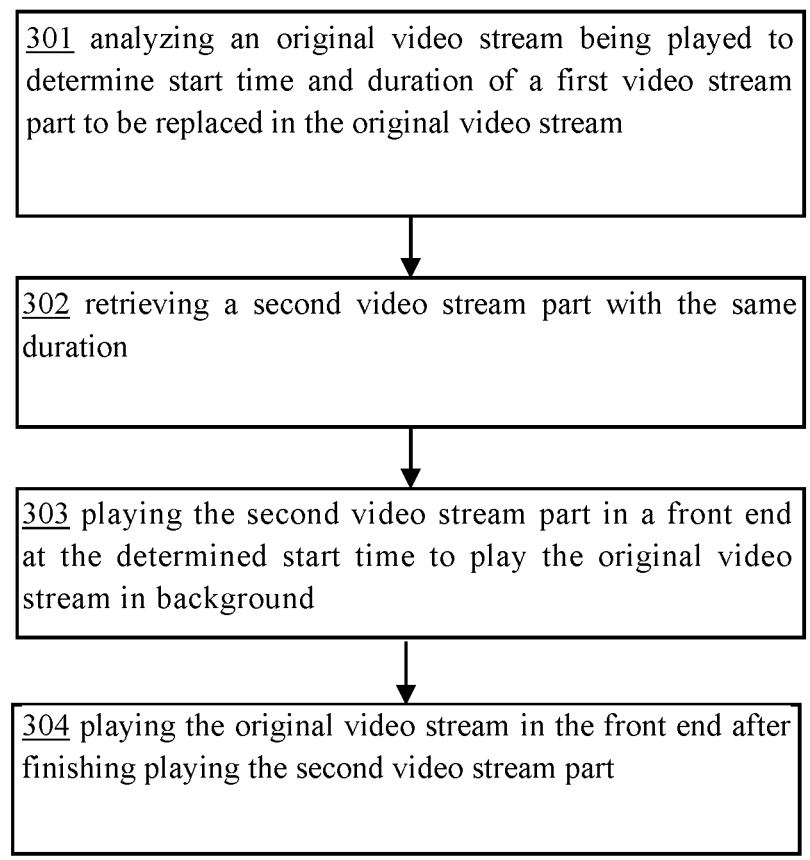
FIG. 3 is an exemplary flowchart of a method for an electronic device according to an embodiment of the present disclosure.

FIG. 3 is a flowchart of a method 300 for an electronic device according to an embodiment of the present disclosure. The method 300 may be used for, for example, the electronic device 100 shown in FIG. 1 or the AP 210 shown in FIG. 2.

As shown in FIG. 3, in 301, the original video stream being played is analyzed to determine the start time and duration of a first video stream part to be replaced in the original video stream. As mentioned above, the original video stream may be, for example, a video stream pre-coded by the operator. As shown in FIG. 2, the electronic device 210 may acquire pre-coded original video stream 242 from the operator 240 through the external network 230 for play. Those skilled in the art will understand that the original video stream may be analyzed in any suitable manner to obtain the start time and duration of the video stream part to be replaced. The suitable manner includes, but not limited to, for example, first decoding the original video stream, and then determining the time slot of the video part to be replaced based on relevant features. For example, the video stream part to be replaced may be an advertising video stream part, which may have specific features, such as background music features, key word features, etc. These specific features can be used to locate the advertising video stream part to be replaced.

Back to FIG. 3, in 302, a second video stream part with the same duration is retrieved. In an embodiment of the present disclosure, the second video stream part with the same duration may be retrieved from a remote server. For example, the electronic device 210 may communicate with the remote server 260 through the external network 230 to retrieve the second video stream part with the same duration. For another example, the retrieved video stream part can be edited so that it has the same duration as the first video stream part to be replaced.

In an embodiment of the present disclosure, the first video stream part may include pre-coded advertising content, and the second video stream part may include OTT (Over The Top) advertising content. This allows advertisers to make flexible adjustments by editing the content of OTT advertisements. In an embodiment of the present disclosure, retrieving the second video stream part with the same duration includes retrieving the second video stream part specific to a user according to the historical play data of the user. For example, the historical play data of the user may include the length and number of repetitions for the user to view a specific advertising video stream part. Those skilled in the art will understand that it is necessary to obtain permission to access the historical play data of the user. Retrieving the user-specific second video stream part based on the user's historical play data allows the content of the advertisement to be adjusted according to the user's preferences without being limited to the pre-coded fixed advertising content of the operator, and this flexibility is beneficial for improving the advertising effect.

Returning to FIG. 3, in 303, the second video stream part is played in the front end at the determined start time so that the original video is played in the background. In 304, the original video is played in the front end after finishing playing the second video stream part. The desired video stream part can be played in the front end by playing the video stream part to be replaced in the background to complete the replacement process. In addition, by playing the original video stream in the background, rather than stopping the original video stream, the retrieval process of the played content is saved, making the switching of the playing content smoother.

In an embodiment of the present disclosure, the decoding processing of the original video stream may be simplified during the background play of the original video stream. Processor resources can be saved by simplifying the decoding processing of the original video stream during this time period. Moreover, since the original video stream of this time period is only played in the background, simplifying the decoding processing of this time period will not reduce the play quality.

Figure 4:
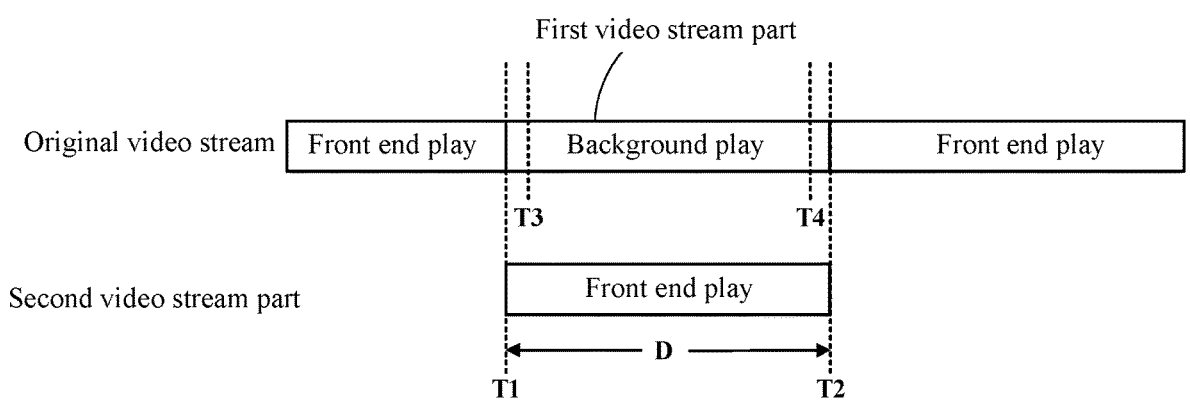
FIG. 4 is a timing diagram of a video stream play according to an embodiment of the present disclosure.

FIG. 4 shows a timing diagram of a video stream play according to an embodiment of the present disclosure. By analyzing the original video stream being played, it is determined that the start time of the first video stream part to be replaced in the original video stream is T1 and the time duration is D. As shown in FIG. 4, the original video stream is played in the front end before the time T1. From the time T1, the first video stream part of the original video stream is played in the background, and the second video stream part is played in the front end. The second video stream part ends playing at the time T2. From the time T2, the original video stream continues to be played in the front end.

In an embodiment of the present disclosure, in order to make the switching between the front end/background play of a video stream part to be replaced and a video stream part expected to be played to be smoother and save processor resources at the same time, the time period for simplifying the decoding processing of the original video stream is further defined. As shown in FIG. 4, simplifying the decoding processing of the original video stream starts at a first preset time T3 after the start time T1, and the normal decoding processing of the original video content is still maintained between the time T1 and the time T3. Moreover, the normal decoding processing of the original video stream starts at a second preset time T4 before the time T2 where the play of the second video stream part ends. In other words, normal decoding processing, instead of simplifying decoding processing, is still performed on the video stream in a time period after the start of and before the end of the background play of the first video stream part of the original video stream. This can ensure that the switching between the front end/background play of the first video stream part and the second video stream part is smoother, and can avoid a decline in the play quality that may be caused by the burst time delay in calling the video stream content.

The present disclosure flexibly replaces part of the content in the pre-coded video stream by analyzing the start time and duration of the video stream part to be replaced, and playing the expected video stream part in the front end and playing the video stream part to be replaced in the background within the duration. The switching between the front end/ background play of the video stream part to be replaced and the video stream part to be played makes the play smoother. Simplifying the decoding processing of the video stream part played in the background can save computing resources.

Those skilled in the art are capable of understanding that all the steps in the aforementioned method may not appear in an embodiment concurrently and may be flexibly combined to be realized in different embodiments.

Although some operations in the aforementioned embodiments are implemented by hardware or software, in general, the operations in the aforementioned embodiments may be implemented in various configurations and frameworks. Therefore, some or all of the operations in the aforementioned embodiments may be executed by hardware, software, or both. For example, at least some operations in the communication technology may be implemented using program instructions 122, the operating system 124 (such as a driver for the interface circuit 118), or firmware in the interface circuit 118 of the electronic device 100. Alternatively or in addition, at least some operations in the communication technology may be implemented at a physical layer, such as hardware in the interface circuit 118 of the electronic device 100.

The present disclosure may be realized as any combination of devices, systems, integrated circuits, and computer programs on non-transitory computer-readable media. One or a plurality of processors may be realized as an integrated circuit (IC), an application-specific integrated circuit (ASIC) or a large-scale integrated circuit (LSI), a system LSI, a super LSI, or an ultra LSI component that executes some or all of the functions described in the present disclosure.

According to each step of the method of the present disclosure, it may also be executed respectively by a plurality of components comprised in the device. According to an embodiment, these components may be realized as computer program modules established to implement various steps of the method, and a device comprising these components may realize the program module structure of the method by computer programs.

The present disclosure comprises the use of software, applications, computer programs, or algorithms. Software, application programs, computer programs or algorithms may be stored on a non-transitory computer-readable medium, so that a computer with one or a plurality of processors may execute the aforementioned steps and the steps described in the attached drawings. For example, one or a plurality of memories save software or algorithms via executable instructions, and one or a plurality of processors may associate a set of instructions executing the software or algorithms to enhance security in any number of wireless networks according to the embodiments described in the present disclosure.

Software and computer programs (also called programs, software applications, applications, components, or codes) comprise machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that may be used to carry or store the required computer-readable program codes in the form of instructions or data structures and may be accessed by a general or special computer or a general or special processor. As used herein, magnetic disks or disks include Compact Discs (CDs), laser disks, optical disks, Digital Versatile Discs (DVDs), floppy disks, and Blu-ray disks, in which magnetic disks usually copy data magnetically, and disks copy data optically via laser. Combinations of the above are also included in the scope of computer-readable media.

In one or a plurality of embodiments, the use of the words "may", "able", "operable as" or "configured as" refers to some devices, logics, hardware and/or elements designed to be used in a specified manner. The subject matter of the present disclosure is provided as an example of the device, system, method, and program for executing the features described in the present disclosure. However, in addition to the aforementioned features, other features or modifications may be expected. It may be expected that any emerging technology that may replace any of the aforementioned realization technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed elements. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations be executed to achieve the desired result. In some cases, multi-tasking and parallel processing may be advantageous.

The invention claimed is:

1. An electronic device, including:
    a memory having instructions stored thereon;
    a processor configured to execute the instruction stored on the memory to cause the electronic device to carry out the following operations:
        analyzing an original video stream being played to determine start time and duration of a first video stream part to be replaced in the original video stream;
        retrieving a second video stream part with the same duration;
        playing the second video stream part in a front end at the determined start time to play the original video stream in background; and
        playing the original video stream in the front end after finishing playing the second video stream part.
2. The electronic device according to claim 1, wherein retrieving the second video stream part with the same duration includes retrieving the second video stream part with the same duration from a remote server.

3. The electronic device according to claim 1, wherein the first video stream part includes a pre-coded advertising content and the second video stream part includes an OTT advertising content.

4. The electronic device according to claim 1, wherein retrieving the second video stream part with the same duration includes retrieving the second video stream part specific to a user according to historical play data of the user.

5. The electronic device according to claim 1, wherein the decoding of the original video stream is simplified during the original video stream is played in the background.

6. The electronic device according to claim 5, wherein simplifying of the decoding of the original video stream starts at a first preset time after the determined start time.

7. The electronic device according to claim 5, wherein normal decoding of the original video stream starts at a second preset time before the play of the second video stream ends.

8. An execution method of the electronic device, comprising:
   analyzing an original video stream being played to determine start time and duration of a first video stream part to be replaced in the original video stream;
   retrieving a second video stream part with the same duration;
   playing the second video stream part in a front end at the determined start time to play the original video stream in background; and
   playing the original video stream in the front end after finishing playing the second video stream part.

9. The method according to claim 8, wherein retrieving the second video stream part with the same duration includes retrieving the second video stream part with the same duration from a remote server.

10. The method according to claim 8, wherein the first video stream part includes a pre-coded advertising content and the second video stream part includes an OTT advertising content.

11. The method according to claim 8, wherein retrieving the second video stream part with the same duration includes retrieving the second video stream part specific to a user according to historical play data of the user.

12. The method according to claim 8, wherein the decoding of the original video stream is simplified during the original video stream is played in the background.

13. The method according to claim 12, wherein simplifying of the decoding of the original video stream starts at a first preset time after the determined start time.

14. The method according to claim 12, wherein normal decoding of the original video stream starts at a second preset time before the play of the second video stream ends.

15. A non-transitory computer-readable medium having instructions stored therein, which, when executed by a processor of an electronic device, cause the electronic device to execute the following operations:
   analyzing an original video stream being played to determine start time and duration of a first video stream part to be replaced in the original video stream;
   retrieving a second video stream part with the same duration;
   playing the second video stream part in a front end at the determined start time to play the original video stream in background; and
   playing the original video stream in the front end after finishing playing the second video stream part.

16. The medium according to claim 15, wherein retrieving the second video stream part with the same duration includes retrieving the second video stream part with the same duration from a remote server.

17. The medium according to claim 15, of which the first video stream part includes a pre-coded advertising content and the second video stream part includes an OTT advertising content.

18. The medium according to claim 15, wherein retrieving the second video stream part with the same duration includes retrieving the second video stream part specific to a user according to historical play data of the user.

19. The medium according to claim 15, wherein the decoding of the original video stream is simplified during the original video stream is played in the background.

20. The medium according to claim 19, wherein at least one of:
   simplifying of the decoding of the original video stream starts at a first preset time after the determined start time; and normal decoding of the original video stream starts at a second preset time before the play of the second video stream ends.

* * * * *